Oct. 29, 1968  O. J. OREBIC ET AL  3,407,464
HIGH SPEED AUTOMATIC APPARATUS FOR MAKING
MOUNTS FOR ELECTRIC LAMPS

Filed Aug. 16, 1965

INVENTORS
Oleg J. Orebic and
Richard W. Handmann
BY

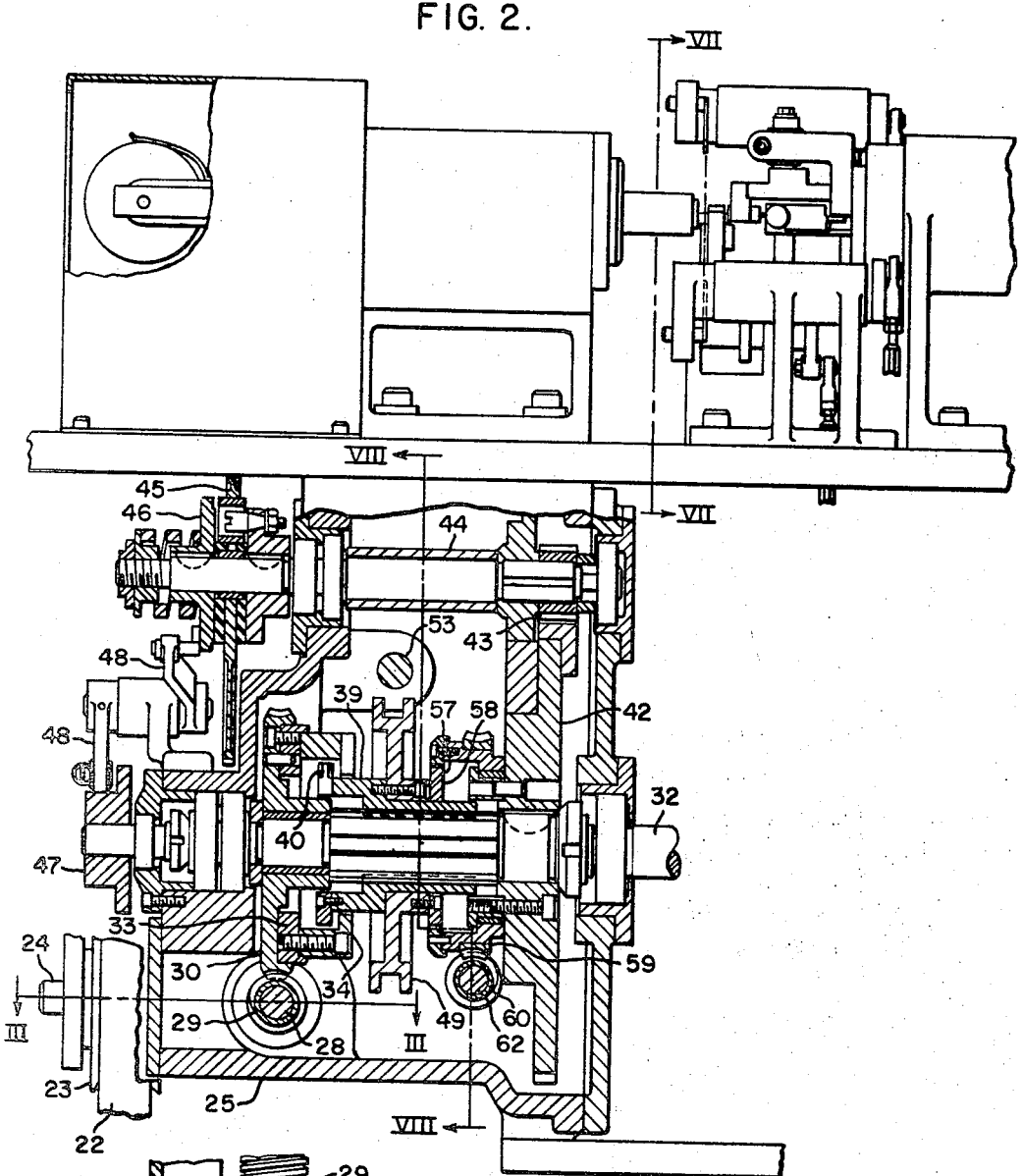
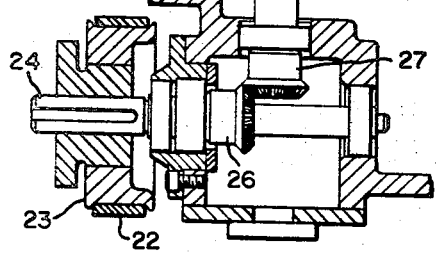

INVENTORS
Oleg J. Orebic and
Richard W. Handmann
BY

Oct. 29, 1968     O. J. OREBIC ET AL     3,407,464
HIGH SPEED AUTOMATIC APPARATUS FOR MAKING
MOUNTS FOR ELECTRIC LAMPS

INVENTORS
Oleg J. Orebic and
Richard W. Handmann
BY

# United States Patent Office 3,407,464
Patented Oct. 29, 1968

3,407,464
HIGH SPEED AUTOMATIC APPARATUS FOR MAKING MOUNTS FOR ELECTRIC LAMPS
Oleg J. Orebic, Upper Montclair, and Richard W. Handmann, Orange, N.J., assignors to Westinghouse Electric Corporation, Pittsburgh, Pa., a corporation of Pennsylvania
Filed Aug. 16, 1965, Ser. No. 480,013
9 Claims. (Cl. 29—25.2)

ABSTRACT OF THE DISCLOSURE

A high speed lamp making apparatus including a stem making machine from which the stems are fed to an endless conveyor which indexes the stems through a plurality of work stations. At least one pair of coil winding machines with each machine of each pair positioned at a work station and synchronized with the indexing movement of the endless conveyor in such a manner that each coil winding machine of each pair forms and supplies a coil to every other stem on the conveyor. A third coil winding machine is positioned at a work station adjacent each pair of coil winding machines and is synchronously and immediately operable in place of either of the coil winding machines of the adjacent pair to wind filament coils and supply them to the stems normally acted upon by either of the machines of the pair thus assuring continued and uninterrupted fabrication of lamp stems at a high production rate.

---

The present invention relates to high speed lamp making machines and particularly to automatically operable apparatus for forming a lamp stem wherein the essential parts therefor are fabricated in situ and thereupon continuously fed into the apparatus.

High speed lamp making equipment is now well known and this equipment operates satisfactorily so long as the material for the fabrication of component parts is available. The disadvantage of such previously utilized apparatus has resided in the fact that upon exhaustion of the supply of material for the various lamp parts, the entire apparatus had to be shut down to enable it to be reloaded with a new supply of material. Such periodic shutdowns materially detracted from the overall production rate of the apparatus which inherently was reflected in manufacturing costs of the complete lamp.

It is accordingly the primary object of the present invention to provide high speed lamp making apparatus wherein component parts for such lamp are fabricated thereon and then fed to the lamp stem following its assembly, with such apparatus having synchronizable standby machinery for the production of such component parts which is immediately rendered operable whenever the supply of material for the making of such parts on a previously operating machine becomes exhausted.

Another object of the present invention is the provision of a high speed lamp making apparatus wherein component parts for such lamp are produced thereon and fed at the proper time to the lamp stem following its fabrication and spare machinery is provided for the making of such component parts which is immediately synchronized with the high speed apparatus and placed into operation without any loss of time or stoppage of production whenever the supply of material becomes exhausted on a previously operating machine, so the latter can then be withdrawn from operation and resupplied with material prior to resynchronizing with the apparatus and restored to operation.

The foregoing objects of the present invention, together with other objects which will become apparent to those skilled in the art from the following description, are achieved by providing a high speed lamp making apparatus comprising a stem making machine from which the stems are fed to an endless chain conveyor which indexes such stems to various positions. Each such position to which the stems are indexed constitutes a work "station" at which certain work is performed or component parts supplied and affixed, so that at the end of horizontal travel of the conveyor a lamp stem will be completely fabricated and then transferred to the sealing machine for sealing the mount to the envelope. At certain of these work stations of the apparatus, coil-winding machines are positioned and synchronized with the indexing movement of such apparatus, on which the lamp filaments are wound and then supplied to the lamp stem. At still additional work stations of the apparatus, a spare coil-winding machine is positioned which is synchronized with the apparatus and hence can be immediately placed into operation to wind filament coils and supply them to the lamp stems at any time that the wire from which the filaments are wound becomes exhausted on a machine previously in operation thus assuring continued and uninterrupted fabrication of lamp stems at a high production rate.

The present invention can be readily understood by reference to the accompanying drawing wherein:

FIG. 2 is a fragmentary view partly in section and taken on the line II—II of FIG. 1 looking in the direction indicated by the arrows;

FIG. 3 is a sectional view taken on the line III—III of FIG. 2;

Figure 1:
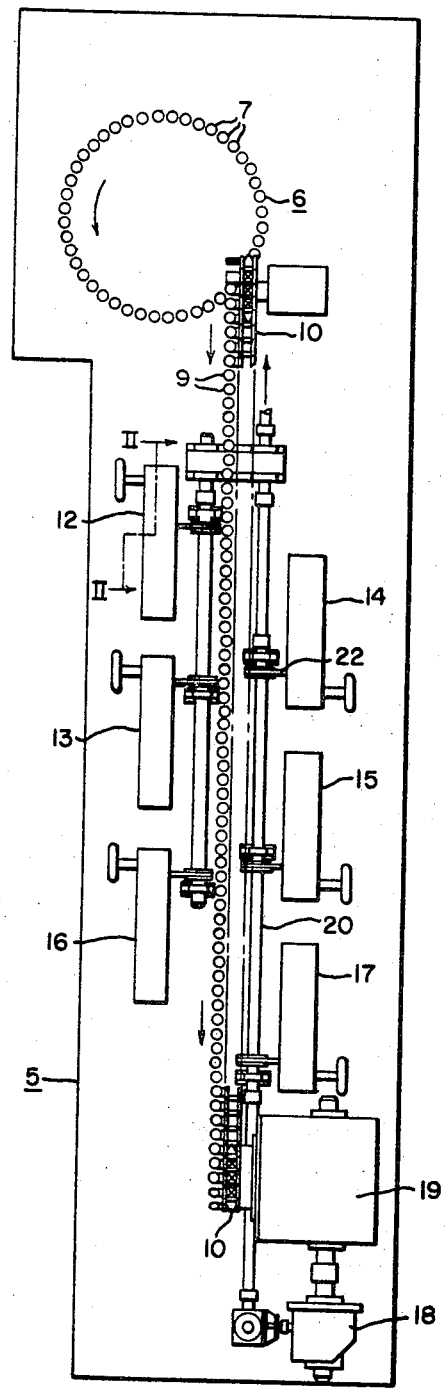
FIGURE 1 is a schematic plan view of a high speed lamp making apparatus for the fabrication of stems and mounts and constructed in accordance with the present invention.

Referring now more specifically to the drawings, the apparatus therein shown comprises a base 5 having mounted thereon a conventional stem machine 6 having a rotatable turret provided with a plurality of peripherally disposed heads 7. These heads are indexable to various work stations where a partially fabricated lamp stem 8 (FIG. 7) including the flare tube and stem press with the customary lead wires sealed therein is formed. Such partially fabricated stem 8 is then fed from the rotatable turret to either the top or bottom row of heads 9 carried by an endless chain vertically mounted conveyor 10 which is indexable in the direction indicated by the arrows in FIG. 1, at a production rate of approximately 3,000/hr.

During transit on the conveyor 10 the partially fabricated lamp stems including their major and minor lead wires are subjected to specific operations after which the heads 9 with their stems 8 (hereinafter designated "A" and "B") are indexed into work stations at which coil winding machines are disposed. At one such station a major filament coil is wound by a coil winding machine 12 and then immediately fed to the lamp stem and clamped to the lead wires of the stem 8 carried by head A with head B passing this station. Simultaneously, further along the line on the same side of the conveyor 10, a major filament coil is likewise wound by a coil winding machine 13, then fed and clamped to the lead wires of the stem 8 carried by head B while loaded head A indexes through this station. Following the clamping of these major filament coils the stems 8 carried by heads A and B are indexed into a position where a minor filament coil is wound by a machine 14, then fed and clamped to the stem in head A while simultaneously a coil winding machine 15 is coiling, feeding and clamping a minor filament to the stem in head B at still another station. Thereafter the stems with their mounted major and minor filament coils are indexed into additional work stations where both coils are properly positioned and their turns-per-inch correctly adjusted, followed by customary gettering of such filament coils.

Inasmuch as the conveyor 10 indexes one head at a time and has a production rate of 3,000/hr. for the stems, while the major and minor filament coil winding machines operate at only 1,500/hr., this requires two machines for each major and minor filament. However, each of such coil winding machines must be reloaded with a new spool of refractory metal wire approximately every four hours and in order to eliminate production interruption, provision must be made to avoid stoppage of the apparatus. To this end, a "spare" coil winding machine 16 is positioned adjacent the conveyor 10 on the same side as the other major coil winding machines 12 and 13, which spare machine is operable to coil, feed and clamp major filament coils whenever required to stems in either head A or head B, depending upon which machine 12 or 13 has exhausted its material supply. A similar "spare" coil winding machine 17 is positioned on the same side of the conveyor 10 as the two minor coil winding machines 14 and 15 and is likewise operable to coil, feed and clamp minor filament coils to the stems in either head A or head B depending upon which machine 14 or 15 needs a new spool of refractory metal filamentary wire.

By reference again more specifically to FIG. 1 it will be noted that a prime mover, such as an electric motor 18, drives the conveyor 10 through an intermittent gear drive arrangement 19 and at the same time rotates a drive shaft 20 extending the length of the base 5. Each of the coil winding machines 12 to 17 inclusive, are in turn operated from this drive shaft 20 by belts or the like 22 which extend to drive pulleys 23 keyed to a short drive shaft 24 journaled in a casing 25 (FIG. 2). As shown more clearly in FIGS. 2 and 3, this latter drive shaft 24 carries a beveled gear 26 meshing with a similar beveled gear 27 which is affixed to an angularly disposed shaft 28. A worm gear 29 forms a part of this latter shaft 28 and meshing therewith is a drive gear 30 (FIG. 2) freely rotatable on a spleened cam shaft 32.

By such arrangement the drive gear 30 of each coil winding machine rotates in full synchronism with the indexed movement of the conveyor 10. Since the latter operates at double the speed of the coil winding machines the two major coil winding machines are phased 180° apart so that coiling machine 12 feeds a major filament coil to the stem 8 in head A with the stem 8 in head B bypassing this work station. Upon reaching the work station of coil machine 13 a major filament coil is then fed to the stem 8 in conveyor head B with the previously loaded head A bypassing this station. Identically the same operation occurs with respect to feeding the minor filament coils by coiling machines 14 and 15 to the stems in conveyor heads A and then subsequently to each head B.

The spleened cam shaft 32 which is journaled to the housing 25 and extends therethrough makes one revolution per cycle and carries a plurality of cams (not shown) which cause operation of the coil winding and transfer mechanism shown in full lines in FIG. 2. Since this portion of the apparatus is old in the art and hence per se forms no part of the present invention, a detailed description thereof is deemed to be unnecessary herein. It should suffice to mention that a filamentary coil is wound by such mechanism during a portion of the operating cycle and the one revolution of the spleened cam shaft, with such coiled filament then being cut and transferred by the reciprocating arm of the coil winding machine, to properly formed lead wires in the stem 8 of the conveyor heads A and B.

Figure 5:
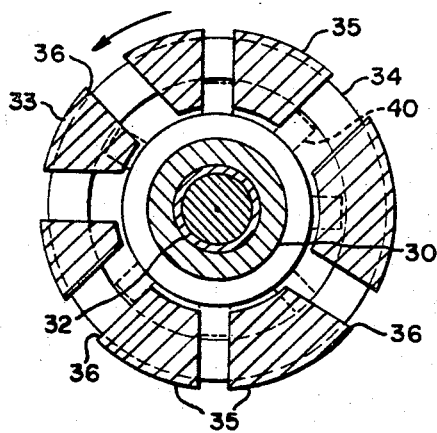
FIG. 5 is a sectional view taken on the line V—V of FIG. 4.
Figure 6:
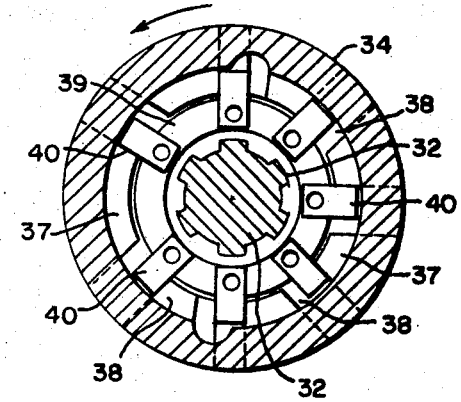
FIG. 6 is a sectional view taken on the line VI—VI of FIG. 4.

The drive gear 30 adjacent to the spleened section of the cam shaft 32 is provided with spaced female clutch plates 33 and 34, as shown more clearly in FIGS. 5 and 6. The clutch plate 33 is composed of wedge-shaped segments 35 projecting from a flat surface with a variable spacing therebetween forming notches 36 (FIG. 5), while the spaced clutch plate 34 simulates a ring gear in which the teeth are in the form of arcuate segments 37 depending therefrom toward the axis of the plate and hence the drive gear 30 and the cam shaft 32 (FIG. 6). Again, a variable spacing is provided between the depending segments 37 thus forming notches 38, and with the width of these variably spaced notches 38 in clutch plate 34 corresponding in dimension to the notches 36 in clutch plate 33, but with such similarly dimensioned notches 36 and 38 being axially displaced 180° relative to each other.

A male clutch sleeve 39 provided with axially projecting teeth 40 is longitudinally movable on the spleened section of the cam shaft 32, as hereinafter described more in detail, with such teeth 40 likewise having a variable spacing therebetween and dimensioned to correspond with the notches 36 and 38. Accordingly, upon longitudinal movement of the male clutch sleeve 39 along the spleened section of cam shaft 32 in one direction of its travel its teeth 40 will engage the notches 36 in female clutch plate 33. Also when such male clutch sleeve 39 is longitudinally moved along the spleened shaft section in the opposite direction its teeth 40 will engage the notches 38 in female clutch plate 34 but with the shaft 32 then positioned 180° from that when teeth 40 engage the notches 36. Since the female clutch plates 33 and 34 thus form an integral part of synchronously rotating drive gear 30, upon engagement of either clutch plate 33 or 34 by the male clutch sleeve 39, the spleen sectioned cam shaft 32 is accordingly rotated one revolution per cycle and if fully synchronized with the indexed movement of conveyor 10, so as to cause the filament coils to be fed to conveyor stem heads A and B at the precise moment, as previously mentioned.

The rotation of spleen sectioned cam shaft 32 accordingly causes rotation of a large ring gear 42 which meshes with a small diameter gear 43 keyed to a short shaft 44 suitably journaled in the housing 25 with one end thereof projecting exteriorly of such housing. A drive gear 45, as shown in FIG. 2, is supported on the projecting end of the shaft 44 and meshes with gearing (not shown) for rotating the head of the coil winding machines to form the filamentary coil all of which, as previously mentioned, is well known to the coil winding art. However, this drive gear 45 is freely mounted on the protruding end of shaft 44 and rotates only when a spring-pressed flat plate clutch 46 compresses pressure drive plates bearing on the side of the drive gear 45. Since the time required to complete winding of a filament coil is but a fraction of the operating cycle and hence one revolution of the drive cam shaft 32, the outer end of the latter is provided with a cam 47 which through linkage 48 (FIG. 2) shifts the clutch plate 46 along the shaft 44 compressing the clutch spring and releasing its pressure plates thus causing disengagement of the clutch plate 46 and a cessation in the rotation of the drive gear 45. However, the continued rotation of drive cam shaft 32 together with the cams (not shown) carried thereby will cause operation of the cutting and transfer mechanism of the coil winding machine thus placing a filament coil in the depending bent ends of the lead wire protruding from the stems 8 in the heads A and B of conveyor 10 (FIG. 7) at the appropriate time.

Figure 4:
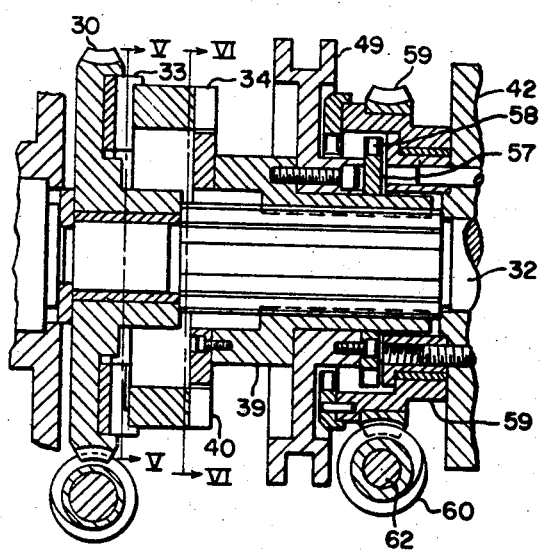
FIG. 4 is a fragmentary enlarged view of a portion of the machine shown in FIG. 2.
Figure 8:
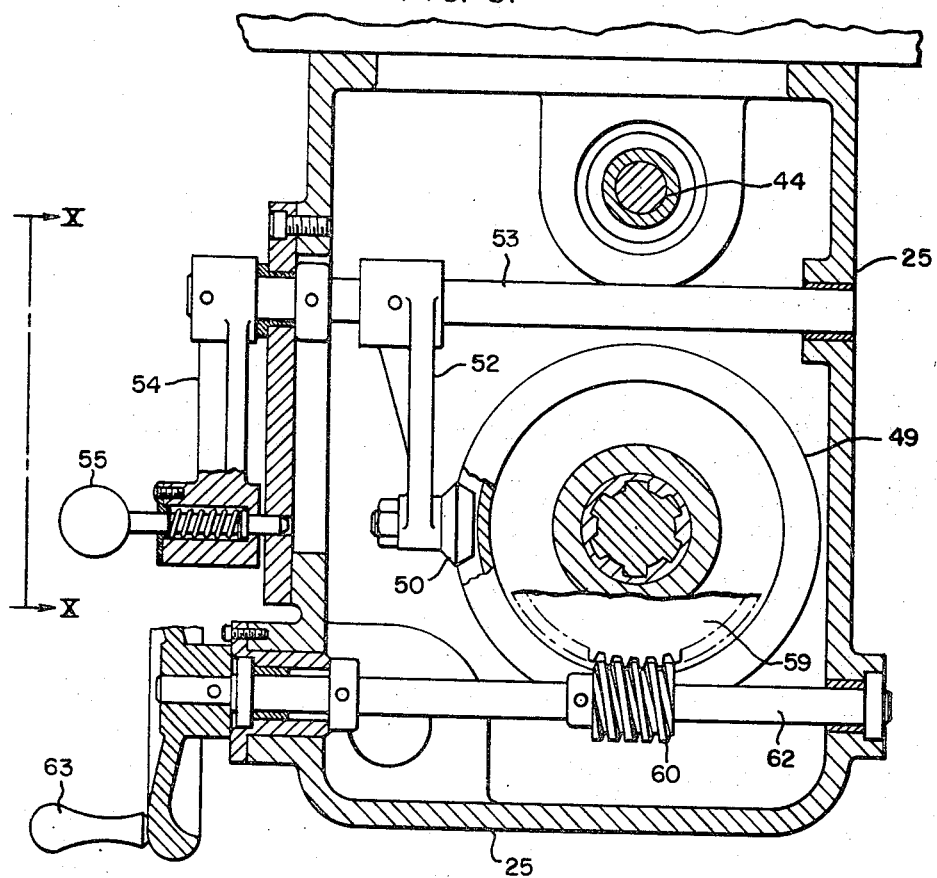
FIG. 8 is a sectional view taken on the line VIII—VIII of FIG. 2.
Figure 10:
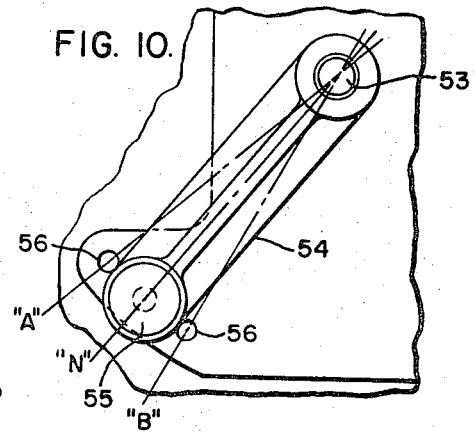
FIG. 10 is a fragmentary view of a portion of the apparatus as shown by the line X—X of FIG. 8 and looking in the direction of the arrows.

Referring again more particularly to FIGS. 2, 4 and 8 it will be noted that the male clutch sleeve 39 has a peripherally grooved pulley wheel 49 affixed thereto. A block slide 50 (FIG. 8) is positioned to ride in the peripheral groove of this wheel 49 with such slide carried at the lower end of an arm 52 and having its upper end keyed or pinned to a shaft 53 journaled in the housing 25 with one end projecting outwardly therefrom. A shifting lever 54 is rigidly affixed to the projecting end of the shaft 53 and at its lower end carries a spring-pressed plunger 55 engageable with any one of three indentations 56 (FIG. 10) which indicate a neutral position "N," a drive position "A" and a drive position "B." When the plunger 55 is in the "N" position, as shown in FIG. 10, the clutch sleeve 39 will be in its position as shown in FIG. 2, with its teeth 40 disposed between the female clutch plates 33 and 34 and hence the drive cam shaft 32 will be completely disconnected from the drive gear 30. Upon movement of the shifting lever 54 to position the plunger 55 in the "B" indentation 56, the clutch sleeve 39 is moved by the pulley wheel 49 to position the teeth 40 in the slots 38 of female clutch plate 34, as shown in FIG. 4, thus causing the drive gear 30 to rotate the drive cam shaft 32. By the same token, if the shifting lever 54 is moved to position the plunger 55 in the "A" indentation 56, the male clutch sleeve 39 is moved to thus position its teeth 40 in the slots 36 provided in female clutch plate 33 which, as above noted, are displaced 180° from that of the slots 38 in female clutch plate 34.

The four coil winding machines 12, 13, 14 and 15 all being operable at the rate of 1,500/hr. will accordingly supply filamentary coils to the stems 8 carried by the conveyor 10 operating at the rate of 3,000/hr. However, the spool of fine refractory metal wire carried by each machine and from which the filament coils are wound will exhaust its supply about every four hours which heretofore has necessitated a cessation in the operation of the entire apparatus. In order to eliminate such stoppage, the two "spare" machines 16 and 17 for winding a major filament coil and a minor filament coil have been provided. Each such spare machine is appropriately connected to the apparatus at the proper time to provide a major and a minor filament coil to the stems 8 of head A or head B as the case may be depending upon which particular machine has exhausted its supply spool of wire.

By reference again more particularly to FIGS. 2 and 10, it will be noted that when the shifting lever 54 is in its neutral "N" position, the male clutch sleeve 39 will have its teeth 40 disposed between the two female clutch plates 33 and 34, as above mentioned. In such position a further male clutch plate 57 will have its teeth 58 meshing with a gear 59 journaled on the clutch hub. As shown more clearly in FIG. 8, this latter gear 59 meshes with a worm gear 60 carried by a shaft 62 journaled within the housing 25 and a hand crank 63 is affixed to the outer projecting end of the shaft 62. Accordingly, with the clutch sleeve 39 in its neutral "N" position the operator turns the hand crank 63 which thus rotates gear 59 and since this is now in engagement with the clutch the latter in turn rotates spleened cam shaft 32 likewise causing rotation of ring gear 42 resulting in hand winding of a filament coil through drive clutch 46 and drive gear 45 for test purposes.

Figure 7:
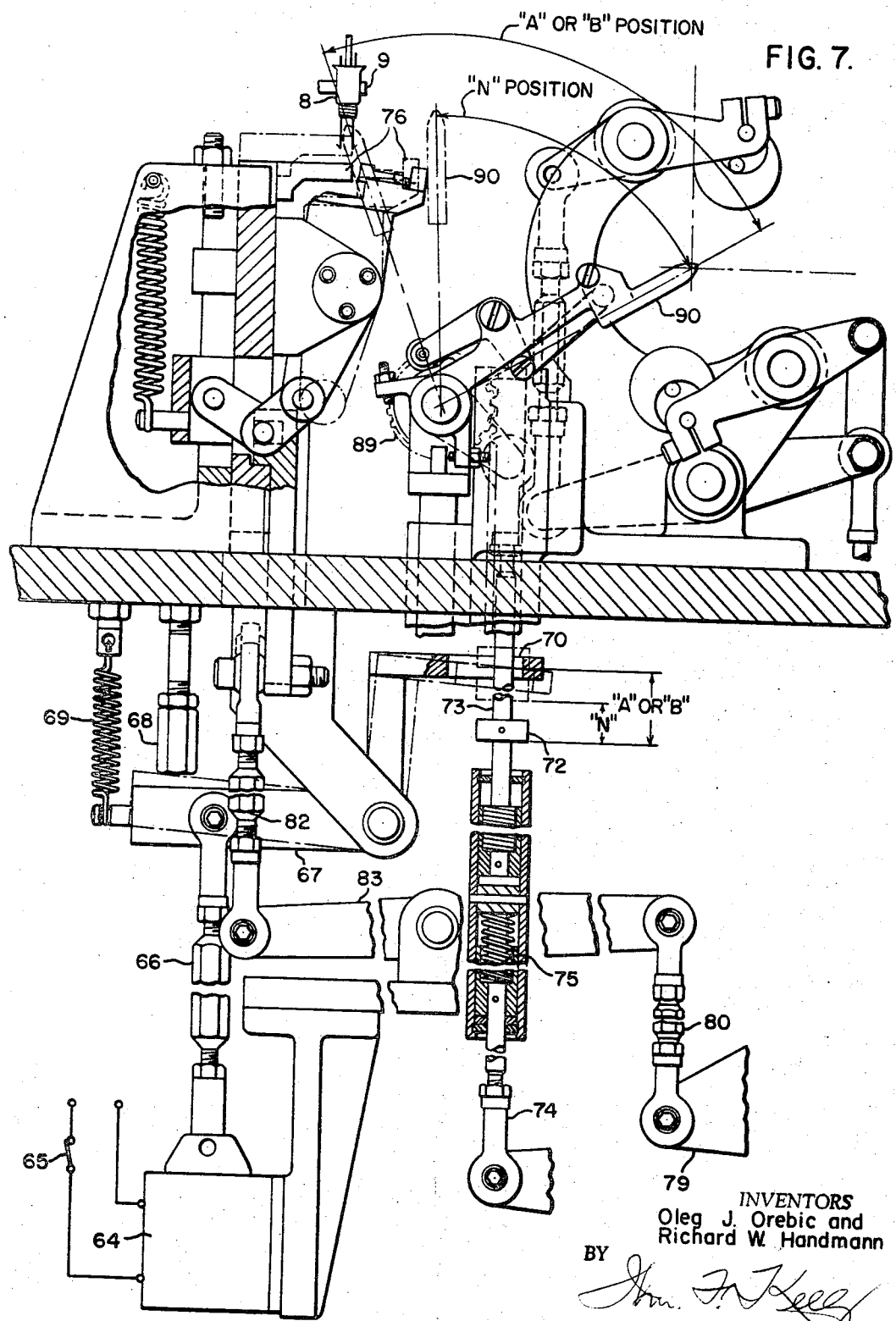
FIG. 7 is a sectional view taken on the line VII—VII of FIG. 2.

Since hand cranking of a filament coil involves complete operation of the coil winding and mounting machine it is necessary to make sure that during such testing the movement of stem conveyor 10 is in no way interfered with and that the usual transfer arm for mounting the filament coil in the stem lead wires likewise does not reciprocate through its complete movement. To this end prior to rotating the hand crank 63 the operator energizes a solenoid 64 by closure of a switch 65 (FIG. 7). The armature of solenoid 64 being connected to linkage 66 pulls downwardly on a bell-crank lever 67 causing one end thereof to leave a stop 68 with expansion of its retaining spring 69. The other free end of such bell-crank lever 67 is provided with an opening 70 of sufficient diameter to normally allow a collar 72 carried by a rack-bar shaft 73 to pass therethrough but upon energization of solenoid 64 with downward movement of the spring-biased end of bell-crank lever 67 its free end is raised sufficiently so it then acts as a "stop." This precludes the collar 72 from passing therethrough and thus limits the upward movement of rack-bar shaft 73 with further upward movement of cam-operated push-rod 74 absorbed by compression of spring 75.

Figure 9:
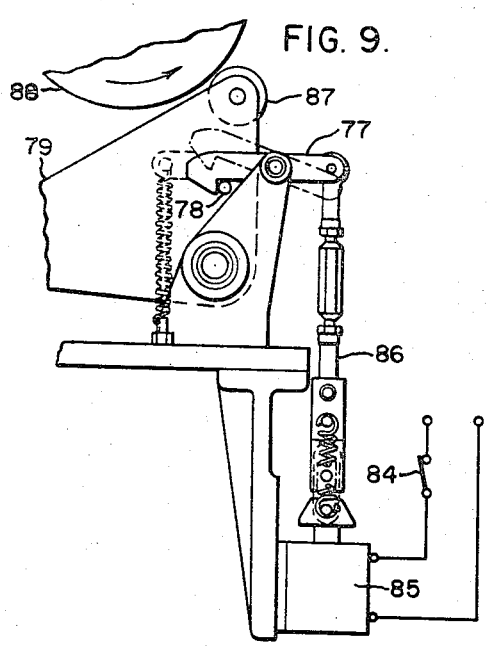
FIG. 9 is a fragmentary elevational view showing a part of the machine which is an extension of that shown in FIG. 7.

During this operator testing period the filament coil mounting portion of the machine comprising the clamping jaws 76 are maintained stationary in their lowered solid line position instead of reciprocating from such position to that shown in dotted lines during normal operation. In this solid line position of FIG. 7 such jaws 76 are thus completely out of the path of movement of the stems 8 in the heads A and B of conveyor 10 and are so maintained by a latch 77 (FIG. 9) which engages a pin 78 carried by a spring tensioned pivoted plate 79 (FIGS. 7 and 9). This plate is in turn connected to the coil mounting jaws 76 through linkage 80 and 82 extending from a rocker arm 83 (FIG. 7) and when it is desired to place the coil mounting jaws 76 back in reciprocatory operation, the operator merely closes a switch 84 thus energizing a further solenoid 85. Such energization accordingly causes the solenoid armature to pull on a rod 86 thus tripping the latch 77 from engagement with the pin 78 and allowing the plate roller 87 to again ride on its operating cam 88 (FIG. 9) affixed to the cam drive shaft 32.

Referring again more specifically to FIG. 7 it will be noted that even with the free end of rocker arm 67 in its raised position as a "stop" for the collar 72, the rack bar shaft 73 is nevertheless raised a sufficient distance as shown by the arrow "N," to cause partial rotation of a pinion gear 89 meshing therewith. Such rotation of gear 89 causes swinging movement of the filament coil transfer arm 90 from its full line pick-up position to its dotted line "N" position shown by the legend in FIG. 7. Accordingly, in order to test the apparatus the operator merely energizes solenoid 64 and deenergizes solenoid 85 and turns the crank 63. A check is thus made of the filament coil dimensions and the cutting and transfer operation thereof. Everything proving satisfactory the operator thereupon ceases turning crank 63, energizes solenoid 85 and deenergizes solenoid 64. This allows the spring 69 to pull the end of rocker arm 67 up against the stop 68 (FIG. 2) and its free end to position the opening 70 in a horizontal plane so that the collar 72 can pass therein and allow the rack bar shaft 73 and pinion gear 89 to cause full swinging movement of transfer arm 90 to its "A" or "B" position so as to deposit the filament coil carried thereby in the bent ends of the lead wires of the stem 8 on the conveyor 10. The two "spare" coil winding machines 16 and 17 thus stand ready for immediate introduction into the production line.

When the operator notes that one of the major coil winding machines 12, 13 or minor coil winding machines 14, 15 has exhausted its material supply of spooled refractory metal wire it is only necessary for such operator to move the shifting lever 54 of such machine to its "N" position whereupon it then ceases to functionally operate, although its drive gear 30 will continue to rotate. The shifting lever 54 of the major filament coil "spare" machine 16, or that of the minor filament coil "spare" machine 17, as the case may be, is then moved to position its spring pressed plunger 55 in the "A" or "B" indentation 56, depending upon which particular machine has exhausted its material supply. Movement of such shifting lever 54 thus moves the male clutch sleeve 39 into engagement with either the female clutch plate 33 or 34 both of which are fully synchronized with each one of the machines 12 to 15, inclusive.

The particular major or minor filament coil machine 12 to 15 which has exhausted its supply of refractory metal wire is then replenished with another spool. The operator then pretests such resupplied machine by hand operation in the manner above described, and having proven it to be entirely satisfactory, he then moves the shifting lever 54 to its "A" or "B" position from which it had previously been moved to the "N" position, thus again placing this particular filament coiling and mounting machine back into its former operating position. Thereupon the "spare" filament coil winding machine is taken out of operation by returning its shifting lever 54 to the "N" position thus restoring such machine to its reserve standby condition ready at a moment's notice for reintroduction into the production line when indicated, by one of the other machines exhausting its material supply. It will, of course, be readily understood that once the "spare" machine 16 or 17 is connected into the production line it may be left in such operative position and any one of the other coil-winding machines 12, 13, 14, or 15, after replenishment of its material supply, thereafter used as a "spare" thereby alternating each coil-winding machine as an operating machine and subsequently as a standby "spare," at the election of the operator.

It should thus be apparent to those skilled in the art from the foregoing that a high speed lamp making apparatus has been herein disclosed in which such apparatus operates substantially continuously. In order to completely eliminate production shut-down when the coiling and mounting machines, which form an essential part of the complete apparatus, exhaust their supply of material, duplicate standby or "spare" machines are always ready and completely synchronized with the entire apparatus and are connected by an operator to the latter whenever the necessity therefore arises. After the original machine has been replenished with a supply of fabricating material and thoroughly hand tested for satisfactory operation, it is then again connected to the lamp making apparatus and the "spare" machine disconnected therefrom but maintained in readiness for reinsertion whenever another machine runs out of material supply.

While the foregoing specific embodiment has considered a stem machine and coil winding machines, the present invention is applicable to any combination apparatus which is used for the fabrication of complex articles comprising a plurality of parts. Such an apparatus comprises a first article component fabricating means (such as the stem machine) operating at a predetermined rate of speed to produce first article components, such as stems at the rate of 3000 units per hour. A conveyor means carrying a plurality of spaced article component supporting means (the supporting heads) is operable to receive the output of the first article component fabricating means. The conveyor is operated by a drive means and is synchronized with the rate of production of the stem machine. At least two additional fabricating means are operable to convert raw materials into second article components at a production rate which is an aliquot part of the rate of production of the stem machine. In the specific example, the two coil winding machines operate at a rate of 1500 units per hour, which is an aliquot part of one-half the rate of the stem machine. The output of the additional fabricating machines are fed to the conveyor in a regular sequence with different heads on the conveyor fed by the different coil winding machines. Of course, the coil winding machines are adapted to be disconnected from the combination apparatus.

There is also provided a spare additional fabricating means (the spare coil winding machine) which is positioned adjacent the conveyor. A clutch means is provided to connect the spare coil winder to feed coils to the conveyor. A part of the clutch is synchronized with one of the coil winders and another part of the clutch is synchronized with the other coil winder. Thus by movement of the clutch from one position to another position, the spare coil winder can be connected in place of either of the regular coil winding machines, when either of the regular coil winding machines becomes inoperative.

Thus the present invention is applicable to any similar type of combination apparatus where a plurality of machines work in combination with a different faster machine, and the rates of production of the plural machines are an aliquot part of the rate of production of the faster machine.

Although one embodiment of the present invention has been herein shown and described, it is to be understood that still further modifications thereof may be made without departing from the spirit and scope of the invention.

We claim as our invention:

1. A high speed automatic apparatus for making mounts for electric lamps, said apparatus comprising:
   (a) a stem machine provided with an indexable turret operable through a plurality of work stations for the fabrication of a lamp stem which is subsequently transferred from said stem machine,
   (b) an endless conveyor provided with a plurality of supporting heads for indexing said lamp stems to a plurality of work stations for further fabrication into a lamp mount at a relatively high rate of speed,
   (c) a coiling and mounting machine disposed at a work station to which the heads of said conveyor are indexed for winding, cutting and mounting a filamentary coil in the lamp stem carried by every other supporting head,
   (d) another coiling and mounting machine disposed at still another work station to which the heads of said conveyor are indexed for winding, cutting and mounting a filamentary coil in the lamp stem carried by the bypassed supporting head,
   (e) drive means connected to said conveyor and to said coiling and mounting machines for operating the same in synchronism to assure mounting of said filamentary coil in the stem of each head while dwelling at its respective work station of the conveyor, and
   (f) a standby spare coiling and mounting machine connected to said drive means in synchronism therewith and disposed at a further work station of said conveyor, and said standby machine being rendered selectively operable by an operator upon either one of the other coiling and mounting machines becoming inoperable by exhaustion of its material supply, to wind, cut, and mount, a filamentary coil in the lamp stem supported by the head bypassing said inoperable machine when such head is at said further work station.

2. A high speed automatic apparatus for making mounts for electric lamps, said apparatus comprising:
   (a) a stem machine provided with an indexable turret operable through a plurality of work stations for the fabrication of a lamp stem which is subsequently transferred from said stem machine,
   (b) an endless conveyor provided with a plurality of supporting heads for indexing said lamp stems to a plurality of work stations for further fabrication into a lamp mount at a relatively high rate of speed,
   (c) a coiling and mounting machine operable at a lower speed than that of said conveyor and disposed at a work station to which the heads of said conveyor are indexed for winding, cutting and mounting a filamentary coil in the lamp stem carried by every other supporting head,
   (d) another coiling and mounting machine operable at the same lower speed as the first said machine disposed at still another work station to which the heads of said conveyor are indexed for winding, cutting and mounting a filamentary coil in the lamp stem carried by the bypassed supporting head,
   (e) drive means connected to said conveyor and to said coiling and mounting machines for operating the same in synchronism to assure mounting of said filamentary coil in the stem of each head while dwelling at its respective work station of the conveyor, and (f) a standby spare coiling and mounting machine connected to said drive means in synchronism therewith and disposed at a further work station of said conveyor, and said standby machine being rendered selectively operable by an operator upon either one of the other coiling and mounting machines becoming inoperable by exhaustion of its material supply, to wind, cut, and mount, a filamentary coil in the lamp stem supported by the head bypassing said inoperable machine when such head is at said further work station.

3. A high speed automatic apparatus for making mounts for electric lamps, said apparatus comprising:

(a) a stem machine provided with an indexable turret operable through a plurality of work stations for the fabrication of a lamp stem which is subsequently transferred from said stem machine, (b) an endless conveyor adjacent said stem machine provided with a plurality of supporting heads for carrying lamp stems away from said stem machine, said conveyor being operable to index said heads at relatively high speed through a plurality of work stations, (c) a coiling and mounting machine operable at a lower speed than that of said conveyor and disposed at a work station to which the heads of said conveyor are indexed for winding, cutting and mounting a filamentary coil in the lamp stem carried by every other supporting head, (d) another coiling and mounting machine operable at the same lower speed as the first said machine disposed at still another work station to which the heads of said conveyor are indexed for winding, cutting and mounting a filamentary coil in the lamp stem carried by the bypassed supporting head, (e) drive means connected to said conveyor and to said coiling and mounting machines for operating the same in synchronism to assure mounting of said filamentary coil in the stem of each head while dwelling at its respective work station of the conveyor, and (f) a standby spare coiling and mounting machine connected to said drive means in synchronism therewith and disposed at a further work station of said conveyor, and said standby machine being rendered selectively operable by an operator upon either one of the other coiling and mounting machines becoming inoperable by exhaustion of its material supply, to wind, cut, and mount, a filamentary coil in the lamp stem supported by the head bypassing said inoperable machine when such head is at said further work station.

4. A high speed automatic apparatus for making mounts for electric lamps, said apparatus comprising:

(a) a stem machine provided with an indexable turret operable through a plurality of work stations for the fabrication of a lamp stem which is subsequently transferred from said stem machine, (b) an endless conveyor to which said lamp stems are transferred and provided with a plurality of supporting heads for indexing said lamp stems to a plurality of work stations for further fabrication into a lamp mount at a relatively high rate of speed, (c) a coiling and mounting machine operable at a lower speed than that of said conveyor and disposed at a work station to which the heads of said conveyor are indexed for winding, cutting and mounting a filamentary coil in the lamp stem carried by every other supporting head, (d) another coiling and mounting machine operable at the same lower speed as the first said machine disposed at still another work station to which the heads of said conveyor are indexed for winding, cutting and mounting a filamentary coil in the lamp stem carried by the bypassed supporting head, (e) drive means connected to said conveyor and to said coiling and mounting machines for operating the same in synchronism to assure mounting of said filamentary coil in the stem of each head while dwelling at its respective work station of the conveyor, and (f) a standby spare coiling and mounting machine connected to said drive means in synchronism therewith and disposed at a further work station of said conveyor, and said standby machine having a clutch operable by an operator to selectively connect such machine to said drive means upon either one of the other coiling and mounting machines becoming inoperative by exhaustion of its material supply, to cause said standby machine to wind, cut and mount, a filamentary coil in the lamp stem supported by the head of said conveyor missed by the machine whose material supply is exhausted, when such head is at said further work station.

5. A high speed automatic apparatus for making mounts for electric lamps, said apparatus comprising:

(a) an endless conveyor to which lamp stems are transferred and provided with a plurality of supporting heads for carrying said lamp stems successively through various work stations at a relatively high rate of speed, (b) drive means connected to said conveyor and operable to cause the stem supporting heads carried thereby to index through said various work stations, (c) a plurality of coiling and mounting machines connected to said drive means for synchronous operation with said conveyor but at a lower speed and disposed at the various work stations to which the heads of said conveyor are successively indexed, with a machine at one of said work stations for winding, cutting, and mounting, a filamentary coil in a stem carried by every other head, another machine duplicating the same operation to the stem carried by the bypassed head at another work station, and a standby spare machine at a still further work station and selectively connectable by an operator to said drive means for winding, cutting, and mounting, a filamentary coil in the stem carried by a head not supplied therewith by one of the other of said machines due to exhaustion of its material supply, and (d) each of said coiling and mounting machines having mechanism operable to connect such machine to said drive means in either of two positions angularly disposed relative to each other, to synchronize such machine with the movement of any conveyor head into the work station of said machine, and said mechanism being operable by hand when disconnected from said drive means for testing the winding, cutting, and mounting, of a filamentary coil in a lamp stem prior to reconnection of said machine to said drive means.

6. A high speed automatic apparatus for making mounts for electric lamps, said apparatus comprising:

(a) an endless conveyor to which lamp stems are transferred and provided with a plurality of supporting heads for carrying said lamp stems successively through various work stations at a relatively high rate of speed, (b) drive means connected to said conveyor and operable to cause the stem supporting heads carried thereby to index through said various work stations for further fabrication into a mount for electric lamps, and (c) a coiling and mounting machine connectable to said drive means for lower speed synchronous operation with said conveyor and disposed at certain work stations to which the stem heads on said conveyor are successively indexed, said machine having a manually operable member for causing such machine to wind, cut and pseudo-mount, a filamentary coil for test purposes, and said machine being provided with a clutch operable to one position to connect said machine in synchronism with said drive means to cause said machine to automatically wind, cut, and mount, filamentary coils in the stems carried by every other head of said conveyor, and said clutch being operable to another position to synchronously connect said machine in different phase relation to said drive means to cause said machine to automatically wind, cut, and mount, filamentary coils in the stems of every other head on said conveyor which are bypassed when said clutch is in its other operative position.

7. A combination apparatus for the fabrication of complex articles each comprising a plurality of parts, said apparatus comprising:
   (a) first article component fabricating means operating at a predetermined rate of speed to produce first article components at a predetermined rate;
   (b) conveyor means carrying a plurality of spaced article component supporting means, said conveyor means operable to receive the output of said first article component fabricating means;
   (c) drive means operable to drive said conveyor means at a predetermined rate of speed which is synchronized with the rate of production at which said first article component fabricating means operates to produce first article components;
   (d) at least two additional fabricating means operable to convert materials into similar second article components, each of said additional fabricating means synchronized with said drive means and operating at a predetermined rate of production which is an aliquot part of the predetermined rate of production at which said first article fabricating means produces first article components;
   (e) means for feeding the output of each of said additional fabricating means to a regular sequence of said conveyor-carried receiving means, with each of said additional fabricating means feeding a different sequence of said conveyor-carried receiving means to avoid duplicating feeding of second article components to any one of said conveyor-carried receiving means;
   (f) means for connecting and disconnecting each of said additional fabricating means from feeding second article components to said conveyor-carried receiving means;
   (g) a spare unit of said additional fabricating means positioned adjacent said conveyor means; and
   (h) clutch means for connecting said spare additional fabricating means to feed said second article components to said conveyor-carried receiving means, said clutch means having different driven parts each of which is synchronized with a different one of said additional fabricating means, and said clutch means operable to connect said spare additional fabricating means to said conveyor means and to synchronize the output of said spare additional fabricating means with the normal operation of any one of said additional fabricating means; whereby when any one of said additional fabricating means is rendered inoperative, said spare fabricating means can be readily substituted therefor.

8. The combination apparatus as specified in claim 7, wherein said first article component means is an electric lamp stem-making machine, and wherein each of said additional fabricating means are filament coil winding machines.

9. The combination apparatus as specified in claim 7, wherein each of said additional fabricating means are operable by hand when disconnected from operation with said combination apparatus in order to test their performance before being connected to said combination apparatus.

References Cited

UNITED STATES PATENTS

| | | | |
|---|---|---|---|
| 2,844,862 | 7/1958 | Cross | 77—5.2 |
| 3,008,216 | 11/1961 | White et al. | 221—243 |
| 3,063,474 | 11/1962 | Bienvenue et al. | 140—71.6 |
| 3,073,356 | 1/1963 | Rowan et al. | 140—71.6 |
| 3,295,183 | 1/1967 | Orebic | 29—25.19 |

JOHN F. CAMPBELL, *Primary Examiner.*

R. B. LAZARUS, *Assistant Examiner.*